United States Patent [19]

Ortloff et al.

[11] Patent Number: 4,688,832

[45] Date of Patent: Aug. 25, 1987

[54] WELL PIPE JOINT

[75] Inventors: Donald J. Ortloff; L. Steven Landriault, both of Houston, Tex.

[73] Assignee: Hydril Company, Houston, Tex.

[21] Appl. No.: 639,939

[22] Filed: Aug. 13, 1984

[51] Int. Cl.$^4$ ............................................. F16L 15/00
[52] U.S. Cl. .................................... 285/175; 285/334; 285/390
[58] Field of Search ................ 285/334, 333, 390, 175

[56] References Cited

U.S. PATENT DOCUMENTS

| | | | |
|---|---|---|---|
| 720,578 | 2/1903 | Greenfield | 285/175 |
| 859,803 | 7/1907 | Cummings | 285/333 X |
| 1,817,808 | 8/1931 | Eaton | 285/390 X |
| 3,050,318 | 8/1962 | Van Der Wissel | 285/334 |
| 3,210,096 | 10/1965 | Van Der Wissel | 285/334 X |
| 3,346,278 | 10/1967 | Yocum | 285/333 |
| 3,994,516 | 11/1976 | Fredd | 285/175 X |
| 4,113,290 | 9/1978 | Miida | 285/334 |
| 4,121,862 | 10/1978 | Greer | 285/333 |
| 4,153,283 | 5/1979 | Hellmund et al. | 285/334 |
| 4,346,920 | 8/1982 | Dailey | 285/334 X |
| 4,373,754 | 2/1983 | Bollfrass et al. | 285/355 X |
| 4,521,042 | 6/1985 | Blackburn et al. | 285/334 |
| 4,582,348 | 4/1986 | Dearden et al. | 285/334 X |

FOREIGN PATENT DOCUMENTS

| | | | |
|---|---|---|---|
| 412446 | 6/1934 | United Kingdom | 285/390 |
| 2074685 | 11/1981 | United Kingdom | 285/390 |

Primary Examiner—Thomas F. Callaghan
Attorney, Agent, or Firm—Vaden, Eickenroht, Thompson, & Boulware

[57] ABSTRACT

A pipe joint for use with oil country tubular goods, such as tubing, casing, and drill pipe, a threaded member adapted to be connected to another threaded member to form such a pipe joint, and a method of making the threaded member are disclosed wherein selected mating threads of the joint and selected threads on the member that are adapted to mate with the threads of another threaded member have less clearance between the load flanks of the selected threads and the mating threads than do the other mating threads of the joint and the other threads of the member, when connected to another threaded member, to cause the selected threads to be stressed initially and to more uniformly stress all of the threads of the joint, when the joint is made-up and when additional external loads are applied.

26 Claims, 21 Drawing Figures

FIG. 8 7"-29 LB/FT TAC-1 THREAD LOAD DISTRIBUTION

FIG. 9 7"-29 LB/FT TAC-1 THREAD LOAD DISTRIBUTION

.001" PITCH DIFFERENCE BETWEEN STEPS
—— ASSEMBLY = 10 800 FT-LB
---- ASSEMBLY = 10 800 FT-LB
    TENSION = 510 000 LB

FIG.10 7"-29 LB/FT TAC-1 THREAD LOAD DISTRIBUTION

.0005 PITCH DIFFERENCE BETWEEN STEPS
—— ASSEMBLY = 10800 FT-LB
---- ASSEMBLY = 10800 FT-LB
TENSION = 510000 LB
—·— ASSEMBLY = 10800 FT-LB
TENSION = 510000 LB
INT. PRESS. = 8160 PSI

65440 LB = THREAD YIELD LOAD

62720 LB = THREAD YIELD LOAD

FIG.11

FIG. 12 7"-29 LB/FT TAC-1 THREAD LOAD DISTRIBUTION

FIG. 13 SURFACE STRESSES $S_H$ (FIG. 1A+1B JOINT)

FIG. 14 SURFACE STRESSES $S_H$ (FIG. 12 JOINT)

FIG. 15 7"-29 LB/FT TAC-1
30° SHOULDER LOAD DISTRIBUTION

ASSEMBLY = 10800 FT-LB
TENSION = 510000 LB
—— FIG. 1A JOINT
---- FIG. 14 JOINT

LOAD (KIPS) ⟶
(NORMAL TO INTERFACE)

FIG. 16 7"-29 LB/FT TAC-1
30° SHOULDER LOAD DISTRIBUTION

ASSEMBLY = 10800 FT-LB
COMPRESSION =
427000 LB
—— FIG. 1A JOINT
338000 LB
---- FIG. 14 JOINT

LOAD (KIPS) ⟶
(NORMAL TO INTERFACE)

FIG.17

PRIOR ART THREAD — LARGE STEP — SMALL STEP — HELIX ANGLE
THREAD NO. vs CIRCUMFERENTIAL DISTANCE CD

FIXED LOAD FLANK GAP — THREAD SHIFT

CONSTANTLY INCREASING GAP — CHANGE IN PITCH ON ONE STEP

THREAD SHIFT PLUS CHANGE IN PITCH ON ONE STEP

VARIABLE PITCH FLANK CLEARANCE ON BOTH STEPS PLUS THREAD SHIFT BETWEEN STEPS

VARIABLE GAP — VARIABLE PITCH FLANK CLEARANCE ON BOTH STEPS

WELL PIPE JOINT

This invention relates generally to a pipe joint for use with oil country tubular goods such as tubing, casing, and drill pipe used in oil, gas, geothermal, and other wells to threaded tubular members adapted to be connected to another threaded member to form the joint, and to the method of making the threaded members. In particular, the invention relates to pipe joints and to members for forming pipe joints having mated threads that when coupled or made-up, are torqued to specified limits to effect performance of the joint. The invention is particularly useful in connections having contact surfaces such as torque shoulders to facilitate make-up.

All joints of this type include a box or female member having internal threads and a pin or a male member having external threads that mate with the internal threads on the box and hold the joint together when the joint is made-up. The threads are usually of a modified buttress type that are designed to provide clearance between the flanks of the threads to allow the joints to be made-up with little torque required until the sealing and shouldering contact surfaces engage initially. There may be just one pair of contact surfaces that not only act as torque shoulders to limit the distance the pin can move into the box but also define sealing surfaces to effect sealing of the joint. Alternatively, there may be two or more pair of engaging contact surfaces where one or more act to seal the joint and one or more act as torque or stop shoulders. Or the joint may have separate sets of engaging sealing surfaces and separate torque shoulders that can also provide a seal. In any event, after the joint is made-up hand-tight, the torque required to completely make-up the joint and to provide sufficient torque to develop desired performance serves to force the contacting surfaces of the joint together with the compressive force required to form the desired performance.

In the prior art, the mating threads on the box and the pin have the same pitch or lead so that in the hand-tight position, all of the threads are substantially in engagement at their load flanks. As make up torque is applied, the threads on the pin and the box adjacent the engaging contact surfaces carry substantially the full reaction to the compressive load imposed on the adjacent engaging surfaces, while the threads farther from these surfaces carry little or none of the reaction load. This results in localized stresses that are intensified when the pipe is placed in a pipe string and subjected to the substantial tensile load of the pipe it is supporting below it. This condition can result in localized yielding within the connection when the loads approach maximum levels.

The present invention provides a means and method for preloading or prestressing the joint so that when the joint is placed under load, the reactive forces on the threads in the joint are more uniformly distributed throughout the joint. This minimizes the presence of high stress points that may cause localized yielding of the joint, thereby increasing the overall utility and functionality of the threaded connection without requiring basic design configuration changes.

This is advantageous for at least two reasons. First, by modifying only the pin or the box in accordance with the invention, the improved load distribution is achieved when the novel pin or box is made-up with a compatible prior art thread. Second, the well-accepted, successful connections of the prior art do not have to be drastically re-configured in order to achieve the advantages of the present invention.

In essence, the invention permits the transfiguration of the prior art rigid thread designs into flexible, more stable, connections that are predictably prestressed during makeup to permit more uniform reaction to load. By understanding the load requirements of the connection, selective preloading techniques can be used to achieve maximum use of thread designs for particular applications.

Assuming, as described above, that a threaded pin and box have one or more contact surfaces or shoulders for providing torque and sealing implementation, then the initial reaction load at makeup will be primarily carried through the shoulders by the threads. Under tensile load, the connection will stretch and eventually the reactive load will be distributed throughout the connection, with the primary components being carried by the threads. Stated simply, any rigid connection, no matter how rigid, will flex and begin to react as a spring under loading conditions.

The present invention recognizes this condition and responds to it by taking the reactions to load into consideration in the design stage, prior to makeup. By altering and/or varying thread pitch of the mating threads within prescribed limits, the resulting spring can be made to perform and react in a desirable, uniform, and predictable manner during load. In addition, where connections include multiple thread sets, the threads on the individual sets may be shifted or offset relative to one another.

The advance provided by the present invention can be compared with basic mechanical structure design such as, by way of example, bridge design. As bridge loads increase, bridges may increase in size and rigidity until they become so cumbersome and unwieldy that they are prohibitive to build. By adapting prestressed designs, where loading actually enhances the design, bridges are lighter weight, less costly, and more effective.

The present invention recognizes the value of preloading to achieve similar ideals in oilfield thread technology. By using built-in stresses to advantage, instead of rigidly building around them, a better end product is achieved.

While the following description primarily uses the well-known two-step, non-tapered, shouldered connections of the Hydril Company to illustrate the features of the invention, it will be understood that the invention described herein is readily applicable to any prior art thread design where it is desirable to distribute the reactive load in a predictable manner during use of the joint.

These and other objects, advantages, and features of this invention will be apparent to those skilled in the art from a consideration of this specification including the attached drawings and appended claims.

In the drawings:

FIG. 9 shows the thread load distribution in a joint wherein the large step thread load flank clearance increases 0.001 of an inch pitch per threads, i.e., the first clearance gap is 0.000, the second is 0.001, the third gap is 0.002, and so on.

FIG. 10 shows the thread load distribution in a joint wherein the large step thread load flank clearance increases 0.0005 of an inch per thread, i.e., the first clearance gap is 0.000, the second is 0.0005, the third gap is 0.0010, and so on.

Figure 1A:
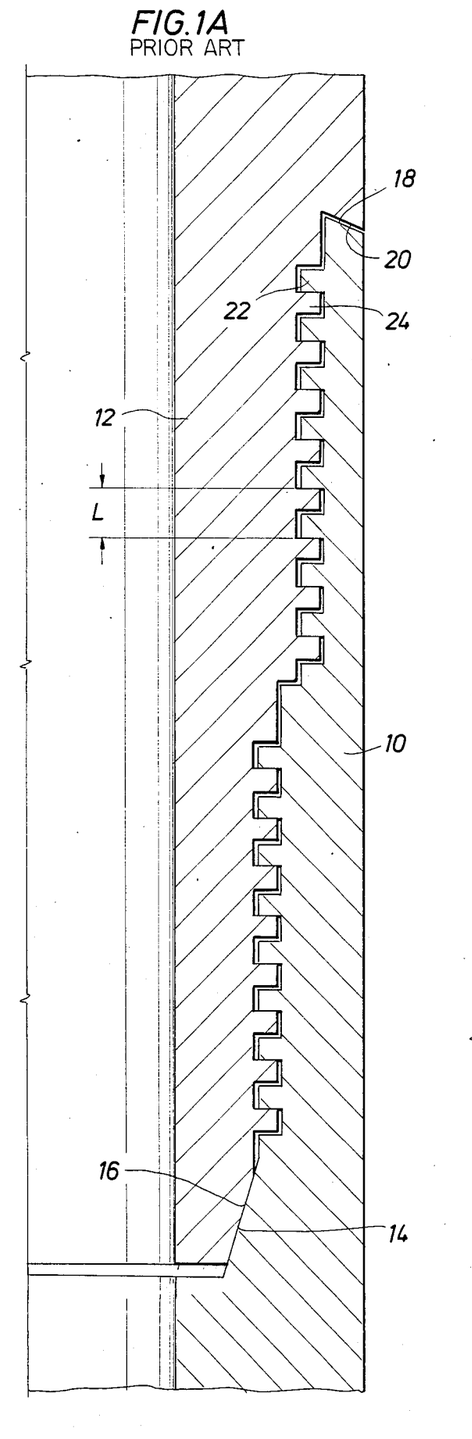
FIG. 1A (prior art) shows a typical two-step type of pipe joint having cylindrical threads made-up to where the threads and the inner sealing surfaces located at the lower end of the pin and the bottom of the box have made contact yet prior to contact between the outer sealing surfaces and torque shoulders located at the upper end of the box and pin, i.e., a gap exists between 18 and 20.
Figure 1B:
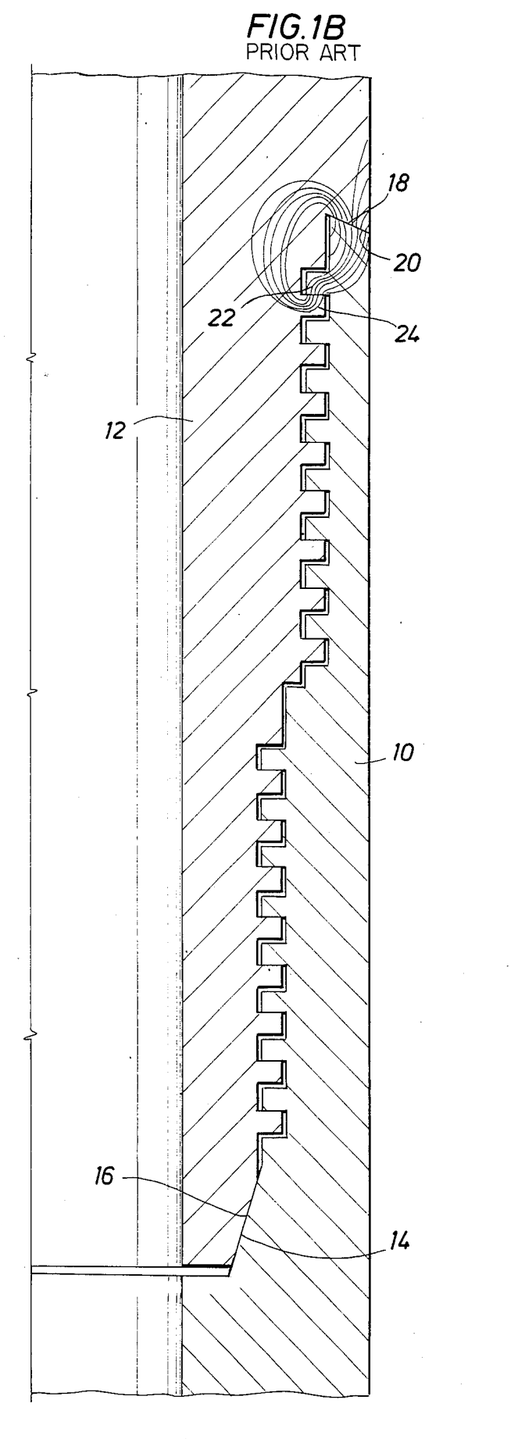
FIG. 1B (prior art) shows the joint of FIG. 1A made-up whereby surfaces 18 and 20 are loaded together by compression resulting from assembly makeup together with the threaded surfaces.

The prior art joint shown in FIGS. 1A and 1B include box 10 and pin 12. The box and pin are attached to or formed on the ends of tubular members such as casing, tubing, and drill pipe. The box has internal threads and the pin has external threads that mate with the threads on the box to allow the pin to be screwed into the box to make up the joint and connect the ends of the tubular members. In this joint, the threads are straight or cylindrical and they are stepped so that half of the threads have a smaller major and minor diameter than the other threads. The larger diameter threads on the box and pin are referred to as the large step (L.S.) and the smaller diameter threads are referred to as the small step (S.S.). The actual distance between the threads, L, called pitch, is the same for both steps. The threads are shown in the drawing as being square, but in practice they are usually a modified buttress of the type shown in FIG. 5.

With the lead of the threads in both steps the same and one being a continuation of the helix of the other, i.e., the distance between the two steps is some variance of the lead, the flanks of the threads will all move into engagement as shown in FIG. 1A when the joint is made-up hand-tight. The hand-tight condition occurs when conical sealing surface 14 on the end of pin 12 makes initial contact with and engages the matching conical sealing surface 16 at the base of the box. Usually these sealing surfaces are inclined from the longitudinal axis of the joint about 14°. At the upper end of box 10 when the joint is made-up hand-tight, sealing surface 18, which is the upper end of the box, is spaced from the mating sealing surface provided by shoulder 20 on pin 12. Surfaces 18 and 20 will be moved into sealing engagement when the joint is completely made-up as shown in FIG. 1B. In this joint they also act as torque shoulders to limit the distance pin 12 can be forced into box 10 for a given make up torque. Sealing surfaces 14 and 16 at the other end of the threads provide some limiting effect to the movement of the pin into the box, but at 14° they are not as positive a stop as is the engagement of the 30° sealing surfaces 18 and 20.

The pin seal surface 16 slides along box surface 14 as surface 18 is moved into engagement with pin shoulder 20, thus energizing the seal. This requires very little torque, usually considered inadequate to prevent accidental unscrewing of the connection in service. Adequate break out resistance is developed by additional rotation of the pin relative to the box after box surface 18 contacts pin shoulder 20. This additional rotation results in elongation of the pin adjacent to shoulder 20 and compression of the box adjacent to surface 18. The forces required to achieve this additional rotation are directly related to the full make-up torque applied to the connection.

The major portion of this force is imposed on thread 22 on the box and thread 24 on the pin. The other threads take some of the load but substantially less than the two engaging threads adjacent the engaging surfaces. The stress lines in FIG. 1B show the concentration of stress in the box and pin between these two threads and the engaging shoulders.

Figures 2, 2A, 3, 4, 5:
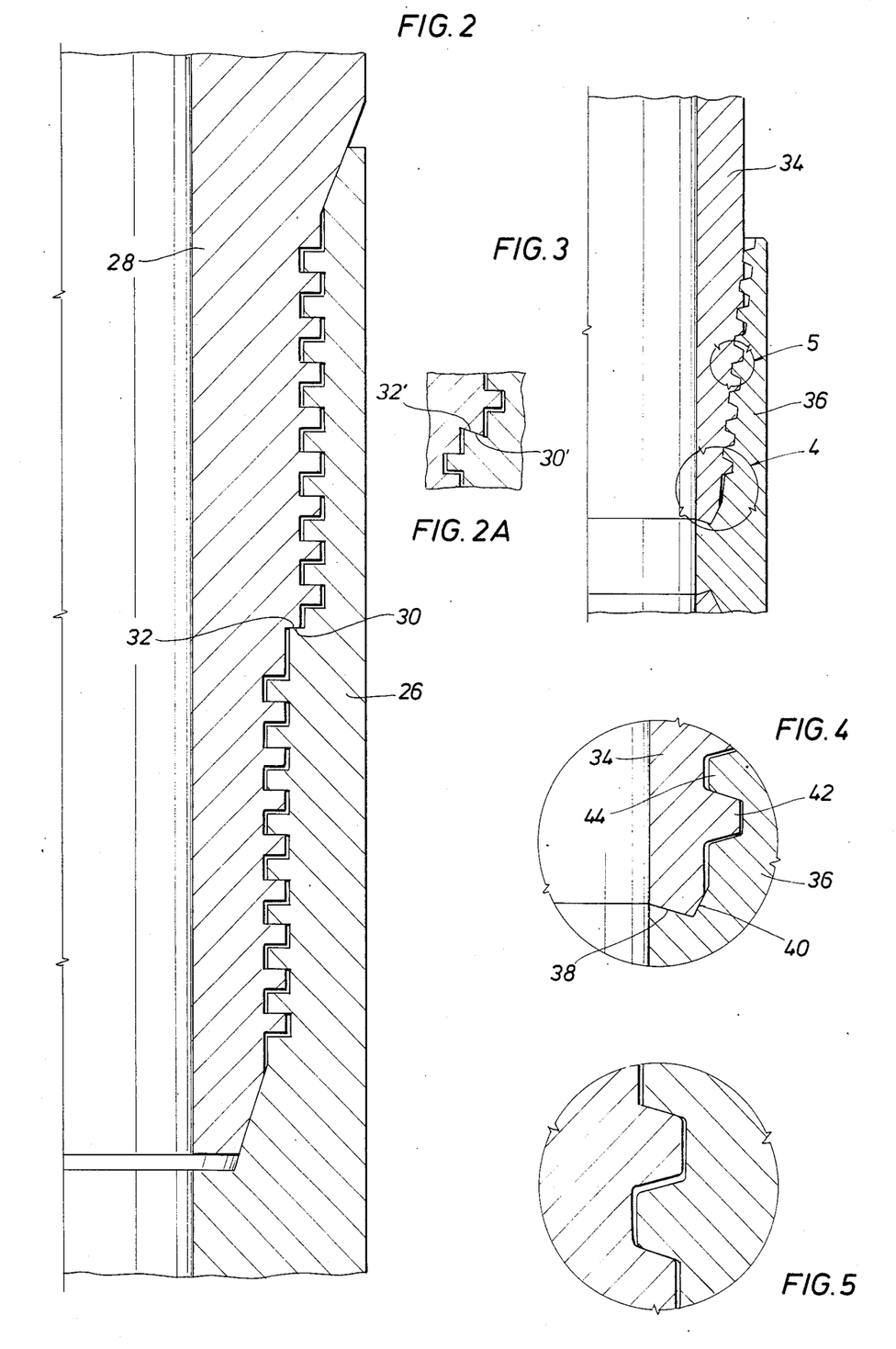
FIG. 2 is a sectional view through a joint of the type to which this invention relates having mating sealing surfaces at both ends of the threads and torque shoulders intermediate the ends of the threads.
FIG. 2A is an enlarged sectional view of a modified torque shoulder arrangement for use with the joint of FIG. 2.
FIG. 3 is a sectional view through a pipe joint of the type to which this invention relates having tapered threads and combined sealing surfaces and torque shoulders at the end of the pin and the base of the box only.
FIG. 4 is an enlarged view of the sealing surface and first thread adjacent the sealing surfaces of the joint of FIG. 3.
FIG. 5 is an enlarged view of the thread form used in this type of joint.

The joint in FIG. 2 includes box 26 and pin 28. This joint differs from the joint of FIGS. 1A and 1B by having 14° degree sealing surfaces on both sides of the threads and separate torque shoulders located between the larger step and smaller step. These are shoulders 30 on the pin and 32 on the box. They can be perpendicular to the longitudinal axis of the joint or inclined to form a hooked shoulder, as shown in FIG. 2A, where shoulders 30' and 32' are inclined about 15° from the transverse axis of the joint. When the pin and box are made-up hand-tight, there will be a gap between torque shoulders 30 and 32 and both the 14° sealing surfaces at either end of the joint will be in engagement or approximately so. The gap between the torque shoulders is made-up or is closed by additional rotation of the pin relative to the box. This will produce the compressive forces between the sealing surfaces required to obtain the desired seals against both internal and external pressures and increase the resistance to unscrewing of the connection.

The joint of FIG. 3 employs tapered threads. The threads in the joint shown in the drawings is a modified buttress thread. The invention, however, is as readily applicable to buttress threads, reverse load flank (hooked) threads, vee threads and other thread forms. As best seen in FIG. 5, a clearance is provided between the flanks of the threads to allow the threads to be free running and to require a minimum amount of torque to be made-up hand-tight. At that point, with this particular joint, the sealing surfaces on the lower end of pin 34 are in engagement with the sealing surfaces provided on box 36. In this embodiment, both the box and the pin have two sealing surfaces that are at different angles to each other. As shown in FIG. 4, pin 34 has sealing surface 38 at a substantially flat angle and sealing surface 40 at a steeper angle that engage matching surfaces on box 36. The sealing surfaces are forced together with sufficient compressive force to provide the seal for the joint. Here again with the pitch of the threads being the same, thread 42 on the pin and thread 44 on the box will be stressed substantially higher than the other threads of the joint.

Figure 6:
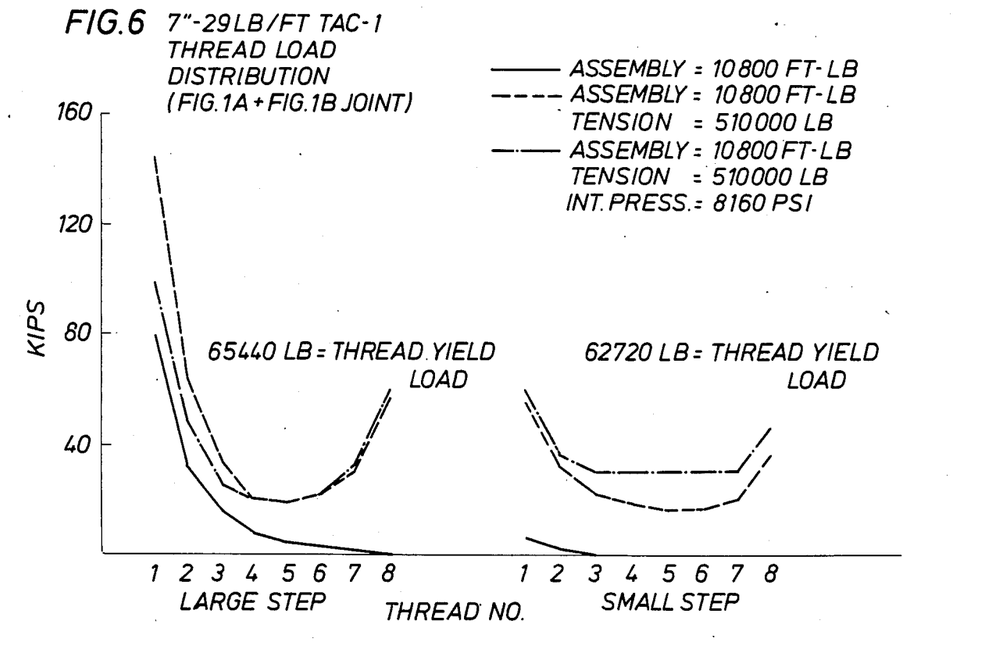
FIG. 6 shows the load distribution on the threads of a two-step joint of the type shown in FIGS. 1A and 1B when the joint is fully made-up, when it is subjected to a tensile load, and when it is subjected to a tensile load and internal pressure.
Figure 7:
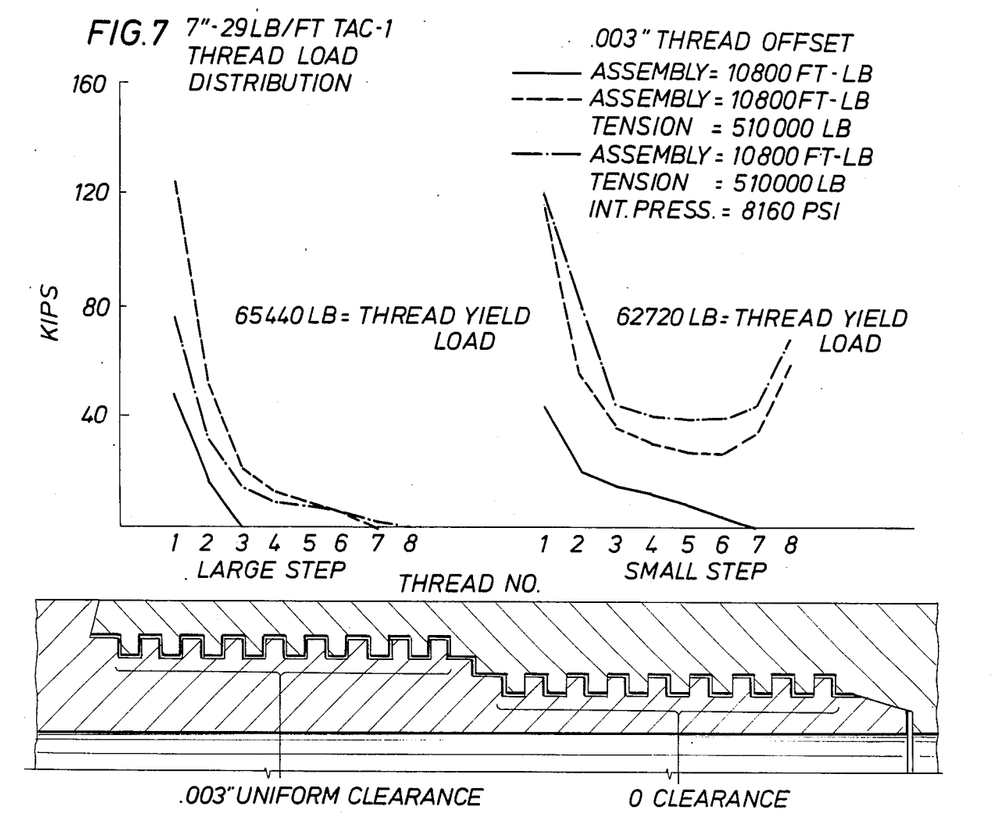
FIG. 7 shows the load distribution on the threads of the same type joint as shown in FIGS. 1A and 1B where the threads of the small step on either the box or the pin, but not both, have been shifted 0.003 of an inch relative to the threads of the large step.
Figure 8:
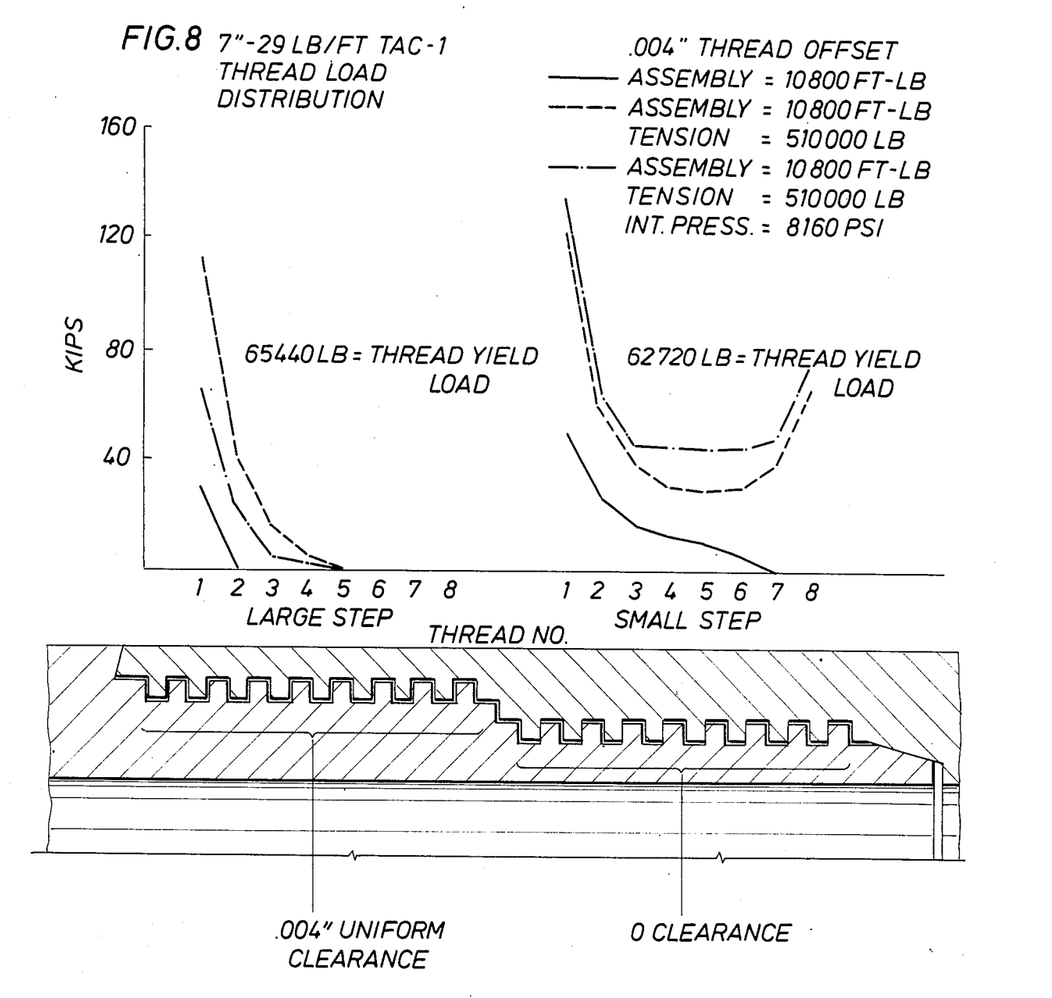
FIG. 8 shows the load distribution on the threads of the same type joint as shown in FIGS. 1A and 1B where the threads of the small step on either the box or the pin, but not both, have been shifted 0.004 of an inch relative to the threads of the large step.
Figure 9:
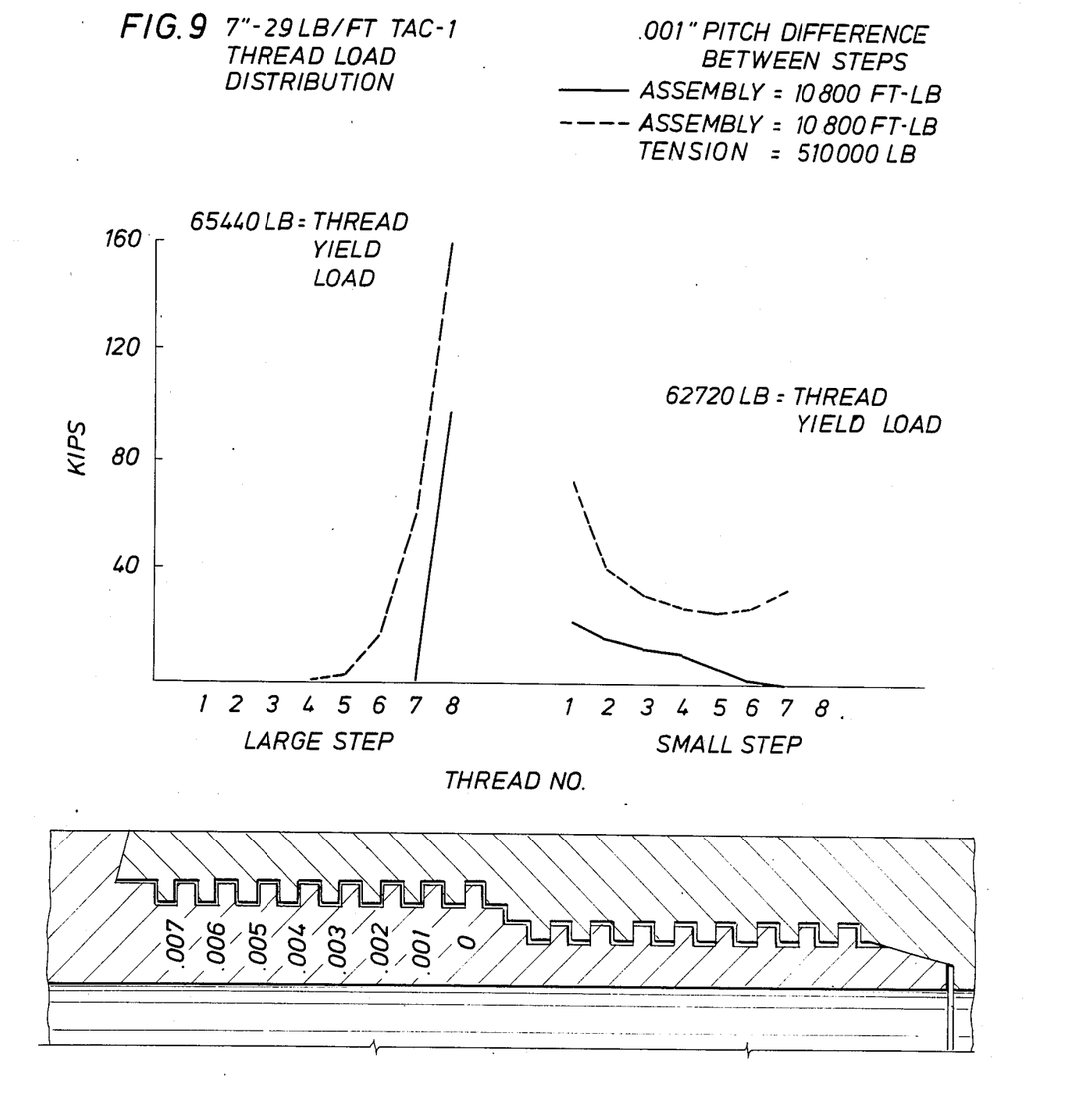
Figure 10:
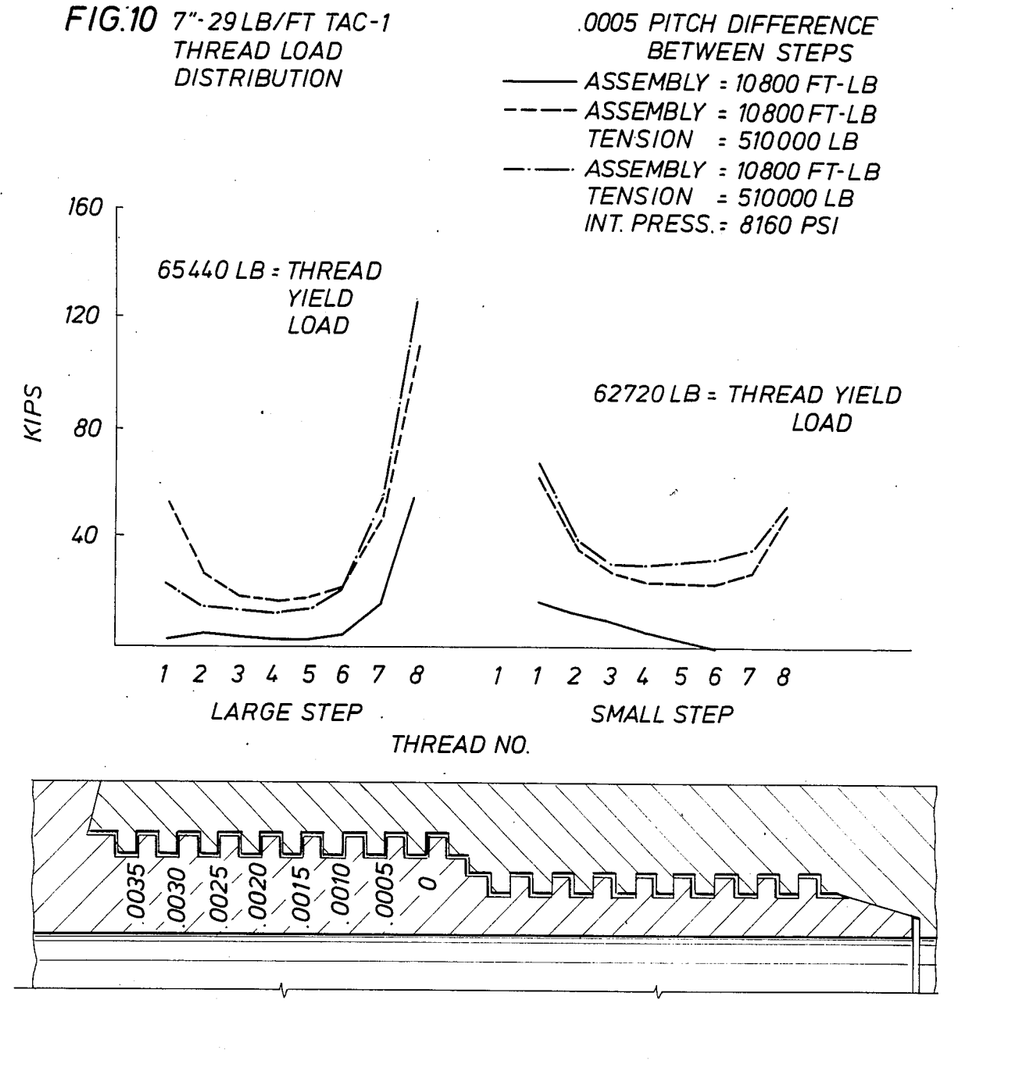

An example of how high the stress on the threads adjacent the contacting surfaces can be as compared to the other threads of the joint is shown in FIG. 6. The graph shows the thread load distribution on a 7", 29 lb./foot casing joint equipped with a joint of the type shown in FIGS. 1A and 1B. When the joint is initially made-up using 10,800 ft. lbs. of torque, thread No. 1 of the large step (thread 22 of FIG. 1A) has already exceeded the calculated thread yield load of 65,440 lbs. by about 15,000 lbs. The load on the other threads of the large step drop off rapidly with threads 4 through 8 carrying substantially smaller loads.

The made-up joint was then subjected to a tensile load of 510,000 lbs. This nearly doubles the load on the No. 1 thread moving it far above the thread yield load limit and increases the load on thread No. 2 up to the thread yield load limit. The load on the remaining threads of large step follow a U-shaped curve with threads 6, 7, and 8 having a substantial increase in load, but they still remain below the yield point. The threads of the small step show what is a typical U-shaped load distribution with threads 1 and 8 having the highest load. When the tensile load of 510,000 lbs. was coupled with an internal pressure of 8160 p.s.i., the load on the No. 1 and No. 2 threads of the large step actually dropped with practically no change in the load on the other threads and substantially no change in the load on the threads of the small step.

As stated above, it is one of the objects of this invention to provide a pipe joint of this type where the force required to provide the compressive force desired between the sealing surfaces of the joint and resultant forces from applied loadings are more evenly distributed among the threads of the joint. In accordance with one embodiment of this invention, this object can be obtained by shifting the threads on one or both steps of either the pin or the box relative to the mating threads on the box or the pin.

FIGS. 7, 8, 9, and 10 show the thread load distribution for various combinations of thread offsets on the threads of a typical two step connection. In all cases, except FIG. 9, simply making up the joint did not overly stress any of the threads with the exception of the joint with a 0.001 inch pitch difference, which produced a large increase in the load on thread 8 in the large step. This is a good indication of how sensitive the load distribution is to slight changes in pitch relative to the mating threads. When the joints were placed in tension and subjected to internal pressure, several of the threads were loaded above the yield point. But as the mismatch or relative pitch difference was decreased, the threads that were exceeding yield were those located away from the sealing surfaces and therefore, should cause less reduction in the compressive force between the two contacting surfaces due to the tensile load.

Figure 11:
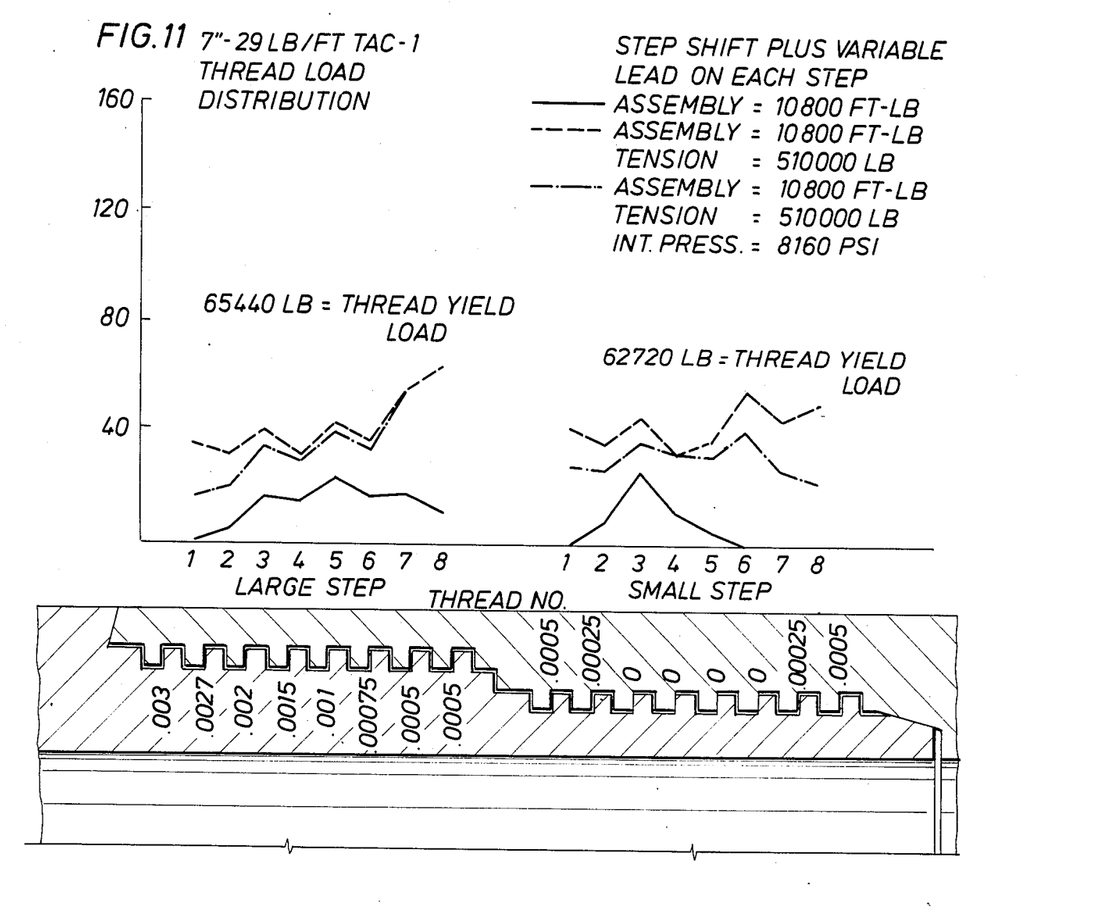
FIG. 11 shows the thread load distribution where there has been a shift in the threads between steps of either the pin or box plus a variable pitch on each step of either the box or the pin to produce selected clearances between the flanks of the threads in the hand-tight position.
Figure 12:
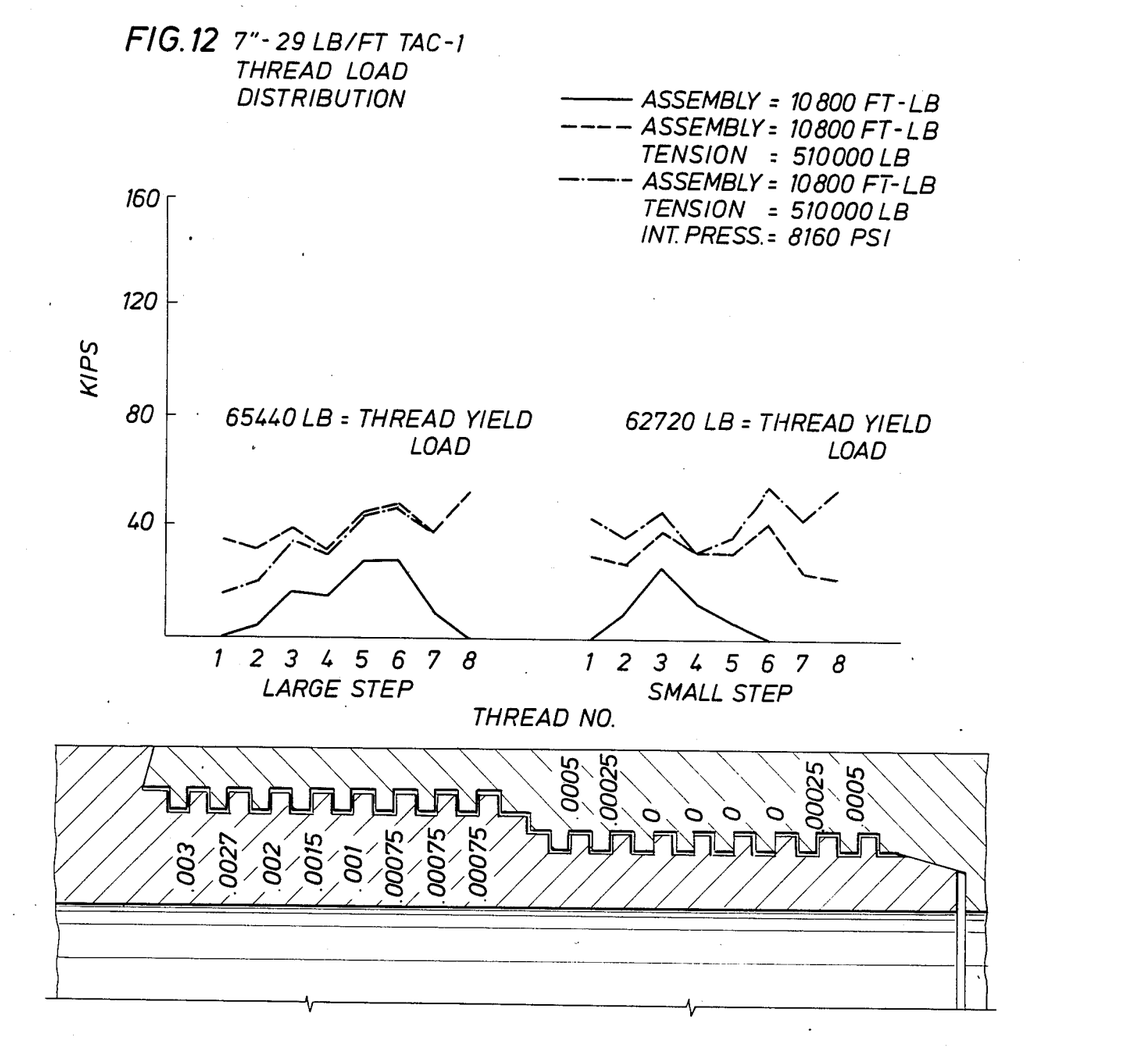
FIG. 12 shows the thread load distribution for the same thread adjustment as in FIG. 11 but arranged to produce slightly different clearances between the thread flanks.

FIGS. 11 and 12 show the load distribution on the threads of this same joint when there has been a thread set shift on one step relative the other plus a variable pitch for both steps on either the box or pin to obtain the clearances shown on the section of the joint shown below the distribution diagram. This more complicated arrangement achieved a reactive load where the distributed load on all threads is at or below the thread yield load lines for both steps.

The spacing between the load flanks of the threads at hand-tight make-up that would produce a uniform load on the threads under working conditions can be calculated. Thus introducing the appropriate gaps between load flanks of selected threads when the joint is hand-tight can reduce the thread loads due to power make-up and imposed external loads.

Figure 13:
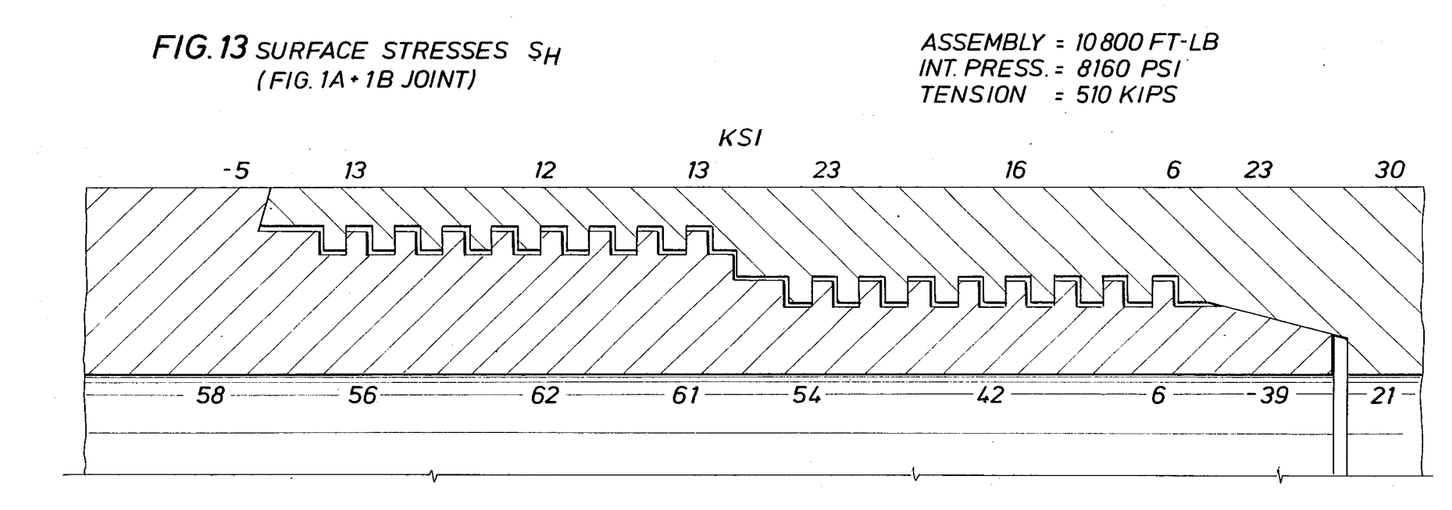
FIG. 13 shows the surface hoop stress imposed on a joint of the type shown in FIGS. 1A and 1B when subjected to tension and internal pressure.
Figure 14:
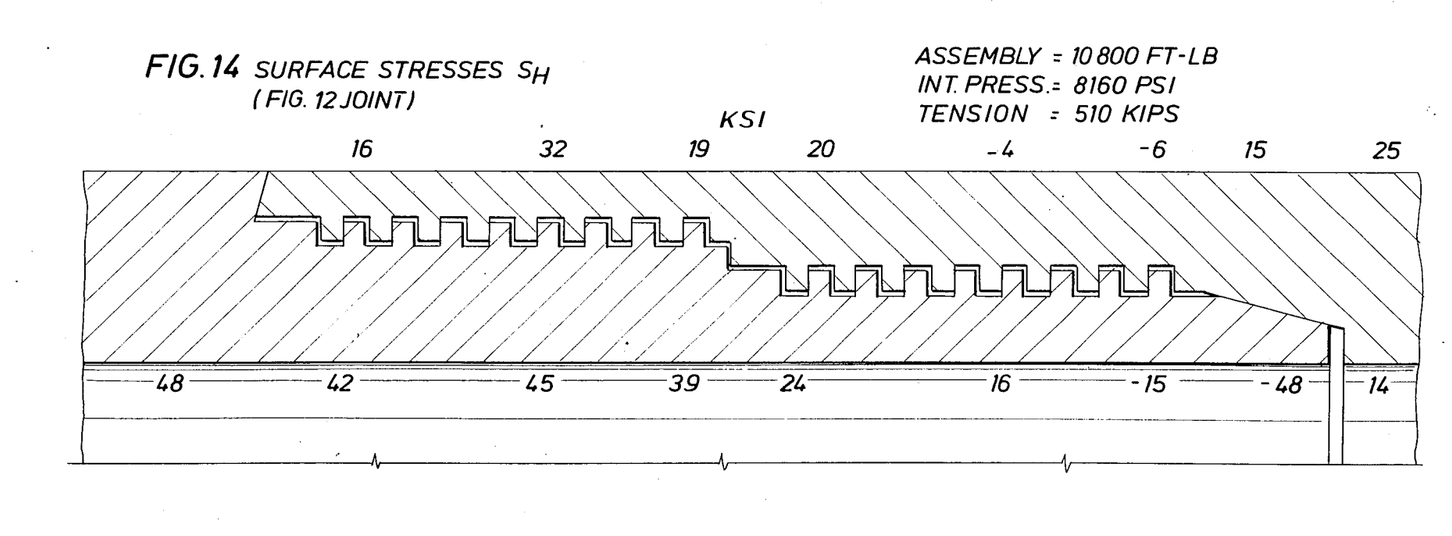
FIG. 14 shows the substantial reduction in the surface hoop stresses on the pin I.D. of the joint of the type shown in FIG. 11 when subjected to the same tension and internal pressure.

The joint of this invention provides advantages other than more uniform distribution of the load on the threads of the joint. FIGS. 13 and 14 show a comparison of the surface hoop stresses on a joint of the type shown in FIG. 1A and a joint of the type shown in FIG. 12, respectively. The stress numbers are in thousands of p.s.i. and indicate a substantial reduction in the surface stresses at the pin I.D. when the pipe is subjected to a tensile load of 410,000 lbs. and an internal pressure of 8,160 p.s.i.g. The reduction results because the threads of the joint in FIG. 12 are under a substantially uniform load. Therefore, there is a more uniform frictional force between the flanks of the teeth and this force will help the pin resist expansion due to internal pressure. In other words, the joint acts more as a unitary structure than the joint of FIG. 1A.

Figure 15:
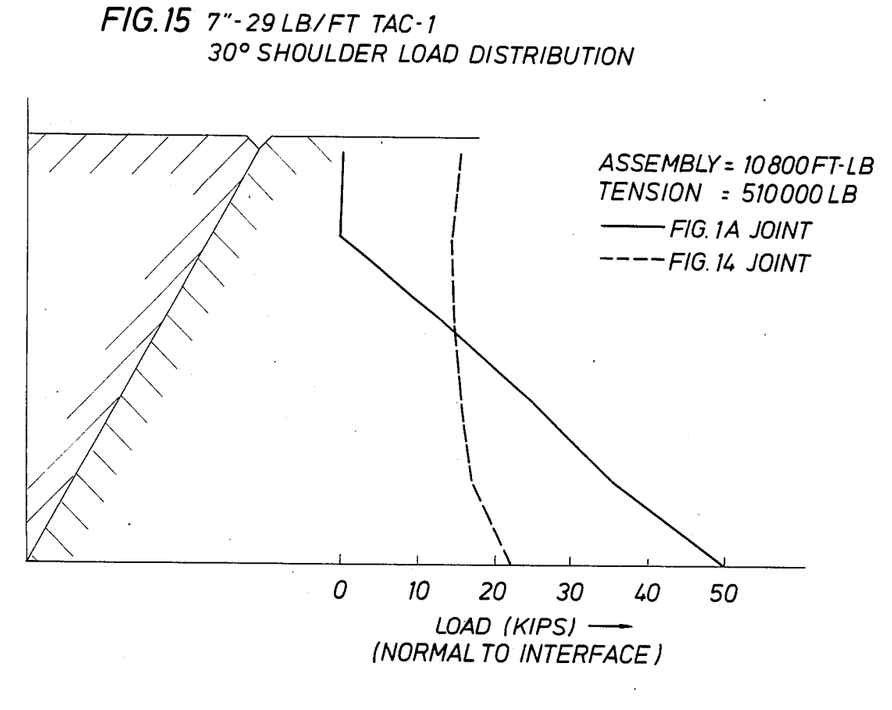
FIG. 15 compares the load distribution across the 30° shoulder at the outer end of the box of the joint of the type shown in FIG. 1A and 1B and that of a joint embodying this invention shown in FIG. 12, when the joints are subjected to a tensile load which illustrates the more uniform load across the shoulder that results from the pretension effects even when high tensile loads are imposed.
Figure 16:
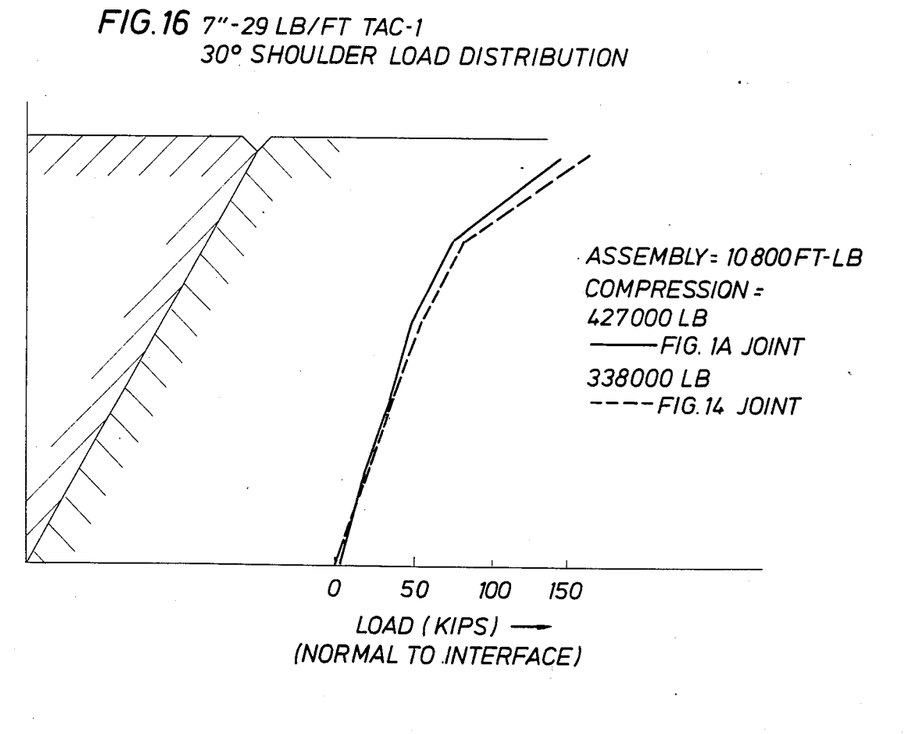
FIG. 16 is the same as FIG. 15 except here the joints are in compression.

FIGS. 15 and 16 show the load distribution over the 30° shoulders of a FIG. 1A type joint and a joint embodying this invention. As shown in FIG. 16, when these joints were subjected to 510,000 lbs. of tensile force, the load distribution across the shoulders is nearly flat with the joint of this invention whereas with the joint of the type shown in FIG. 1A, the load distribution drops rapidly to zero adjacent the outside of the joint. This further shows the high concentrations of load adjacent the inside surface of the joint because of the short distance between the adjacent highly loaded threads and the shoulders.

FIG. 16 confirms this. When the joints are under compression, a compressive load of 338,000 lbs. in the joint of this invention produced the same load distribution across the shoulders as 427,000 lbs. did with the joint of FIG. 1A. Thus, an improvement in the load distribution in one direction, for example a tensile load, can have a negative effect on the load distribution for a compressive load. Therefore, the effects should be balanced so that both are within acceptable limits. Here, the modification that results in a compressive load of 338,000 lbs. producing the same load distribution as previously obtained with a 427,000 lb. compressive load is acceptable when balanced with the improvement in the load distribution for a tensile load, which is the condition most likely found in the field.

Figure 17:
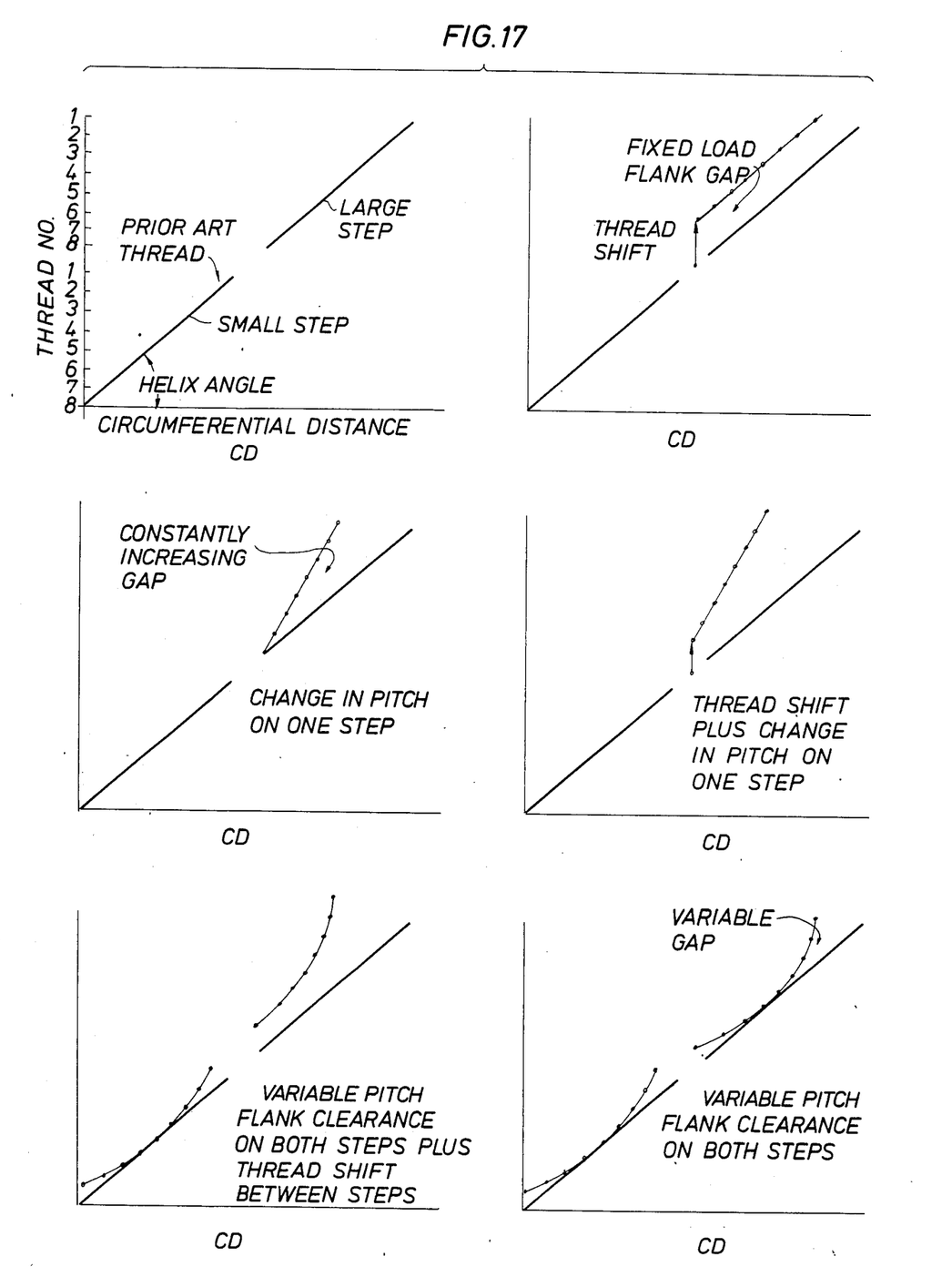
FIG. 17 are graphs of the circumferential distance along the joint that each thread is located for various embodiments of this invention as compared to the conventional thread of this type for joints of the two-step straight or cylindrical thread type.

FIGS. 17 shows how the thread locations are altered from those of a traditional two-step thread with a uniform pitch and zero offset between steps by shifting the steps, by varying the pitch, and by doing both. The thread locations are for joints where the stop shoulders are near pin thread No. 1 on the large step.

Figure 18:
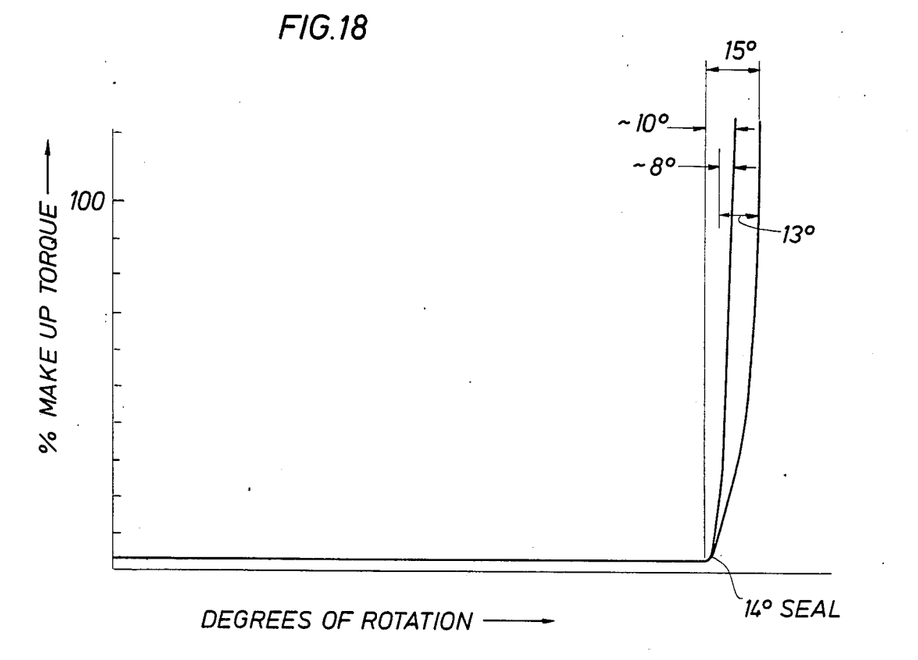
FIG. 18 is a graph of torque versus degrees of rotation of the pin relative to the box of the joint of the type shown in FIGS. 1A and 1B and a joint embodying this invention.

FIG. 18 is a graph of percentage of make up torque versus degrees of rotation of a joint of the type shown in FIG. 1A, which is shown in the solid line, and that of a joint embodying this invention, shown in the dash lines. Both joints move along the same line with very little torque until they reach point A, where both joints are made-up hand-tight. From there to total make up of the joint, the degrees of rotation for the joint of FIG. 1A are between 8° to 10°, whereas the joint of this invention increases the degrees of rotation to make up to approximately 15°. This results in a fifty to one-hundred percent improvement. The 15° rotation is more easily observed than an 8° to 10° movement between the pipe in final make up and the same is true when the joint is broken out.

Figure 19:
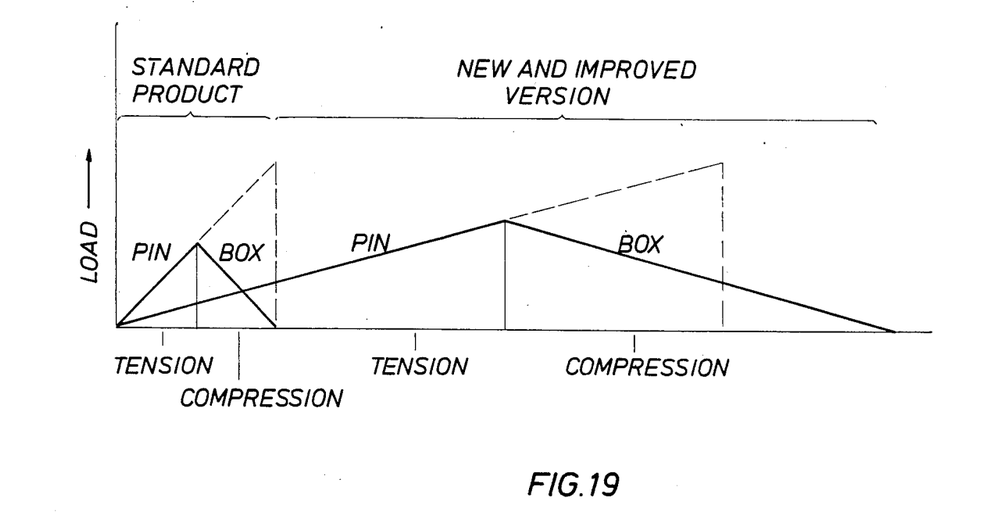
FIGS. 19 is a comparison of load versus deflection graphs of a joint of the type shown in FIGS. 1A and 1B and a joint embodying this invention.

FIG. 19 shows the advantage of distributing the load uniformly among the threads of the joint so that the entire joint is stressed uniformly rather than having a high concentration of stress adjacent one end only.

The graph of FIG. 19 plots load in lbs. against deflection with the type joint shown in FIG. 1A with very short distance between the threads adjacent the engaging shoulders and the first threads that take the load. The deflection curve for both the pin and the box is relatively steep, therefore, when you add tension to the pin, it may quickly move to the point where there is no compression left in the shoulder of the box as shown by the dotted lines. Whereas with the joint embodying this invention, the deflection for the same tensile and compressive load in the box and the pin is substantially greater. This means that the same tension on the joint will still leave substantial compression in the box, thereby insuring that the sealing surfaces remain in engagement under sufficient compression to maintain a satisfactory seal for the joint.

From the foregoing it will be seen that this invention is one well adapted to attain all of the ends and objects hereinabove set forth, together with other advantages that are obvious and that are inherent to the method.

The invention having been described, what is claimed is:

1. For use in forming a pipe joint, a threaded tubular member adapted for connecting to another threaded member to form a threaded connection between the two members, comprising a tubular body, a projecting helical rib on the body forming screw threads having load flanks shaped to have clearance between the flanks of the thread and the load flanks of the threads of the threaded member to which the member is adapted to be connected and a torque shoulder on the body to engage a torque shoulder on the other threaded member as the connection is being made up to limit the distance one of the members can enter the other for a given make-up torque, said threads being formed on the body so that selected threads away from the torque shoulder will have less clearance between them and the mating threads on the other member than do the threads on the member adjacent the torque shoulder and the mating threads on the other member when the torque shoulders engage so that the selected threads will engage the mating threads on the other member before the other threads adjacent the torque shoulder and the mating threads on the other member engage to cause the selected threads to be loaded initially to provide the initial force between the torque shoulders and to more uniformly load all of the threads when the connection is made-up and additional external loads are applied.

2. For use in forming a pipe joint, a threaded tubular member adapted for connecting to another threaded member to form a threaded connection between the two members, comprising a tubular body, a projecting helical rib on the body forming screw threads having load flanks for engaging the load flanks of the threads of the other threaded member, said threads being formed to have clearance between the load flanks of the thread and the load flanks of the threads of the threaded member to which it is adapted to be connected so that the threads are free running until the connection is made up hand-tight, a torque shoulder on the body to engage a torque shoulder on the other threaded member as the connection is made up to limit the distance one of the members can enter the other for a given make-up torque, said threads being formed on the body so that selected threads away from the threads adjacent the engaging torque shoulders have less clearance than those adjacent the engaging torque shoulders so that the selected threads will engage the mating threads on the other member before the mating threads of the members adjacent the torque shoulders engage to cause the selected threads to be loaded initially as the joint is made up and to more uniformly load the threads when the connection is made-up and additional external loads are applied.

3. The threaded tubular member of claim 2 in which the pitch of at least a portion of the threads away from the torque shoulder is advanced toward the shoulder relative to the pitch of the threads on the other member to which it is adapted to be connected.

4. The threaded tubular member of claim 2 in which the pitch of the selected threads is changed to reduce the clearance between the load flanks of the selected threads and the threads of the other member to which it is adapted to be connected to less than the clearance between the threads on the member adjacent the torque shoulders and the threads on the other member.

5. The threaded tubular member of claim 2 in which the pitch of the threads of the member is varied to provide progressively decreasing clearances between the load flanks of the threads of the member and the load flanks of the threads of the other member to which it is adapted to be connected in the direction away from the torque shoulder.

6. The threaded tubular member of claim 2 in which the pitch of the threads of the member is varied to provide varying clearances between the load flanks of the member and the threads of the other member to which it is adapted to be connected.

7. The threaded tubular member of claims 2, 3, 4, 5, or 6 in which the threads on the member are straight and are divided into a large step and a small step having a major diameter and a minor diameter smaller than the major and minor diameters of the large step.

8. The threaded tubular member of claim 2 in which the threads of the member are straight and are divided into a large step and a small step having a major diameter and a minor diameter smaller than the major and minor diameters of the large step and the threads on the small step are offset from the threads of the other member to which the member is adapted to be connected to cause at least some of the threads on the small step of the member to engage the threads of the other member before the threads on the large step engage the threads of the other member.

9. A well pipe point including a box having internal threads and a pin having external threads for mating with the internal threads of the box to make up the joint, said threads having clearance between the thread load flanks, and engaging contact surfaces on the box and pin to engage and limit the distance the pin can enter the box when the joint is made-up with a given make-up torque, the improvement comprising selected threads on the box and the pin farthest from the engaging contact surfaces having less load flank clearance than the clearance between the threads on the box and the pin that are adjacent the engaging contact surfaces when the joint is made-up hand-tight to cause threads other than the threads closest to the engaging contact surfaces to be stressed initially and as further relative rotation of the members results from make-up torque to produce more uniform stress in the threads and in the box and pin when the joint is made-up.

10. The well pipe joint of claim 9 in which the pitch of at least a portion of the threads away from the engaging contact surfaces on one of the box or the pin is advanced toward the engaging contact surfaces relative to the pitch of the threads on the other of the box or the pin to reduce the clearance between the load flanks of the selected threads to less than the clearance between the threads adjacent the engaging surfaces when the joint is hand-tight.

11. The well pipe joint of claim 9 in which the pitch of the selected threads of at least one of the mating threads is changed to alter the load flank clearance between the flanks of the selected threads from the clearance between the threads adjacent the engaging contact shoulders when the joint is hand-tight.

12. The well pipe joint of claim 9 in which the pitch of at least one of the mating threads is varied to provide progressively decreasing clearances between the load flanks of the threads in the direction away from the engaging contact shoulders to provide more uniform stress in the threads when the joint is made-up.

13. The well pipe joint of claim 9 in which the pitch of at least one of the mating threads is varied to provide varying clearances between the load flanks of the threads to provide more uniform stress in the threads when the joint is made-up.

14. The well pipe joint of claims 9, 10, 11, 12, or 13 in which the threads are straight and are divided into a large step and a small step having a major diameter and a minor diameter smaller than the major and minor diameters of the large step.

15. The well pipe joint of claim 9 in which the threads are straight and are divided into a large step and a small step having a major diameter and a minor diameter smaller than the major and minor diameters of the large step and the pitch of the threads on the small step of one of the box or pin is varied from the pitch on the other of the box or pin to cause at least some of the threads on the small step of the box and pin to engage before the threads on the large step to more evenly distribute the stress on the threads when the joint is made-up.

16. A well pipe joint comprising a box and a pin having mating internal and external threads respectively for moving the pin axially into the box upon rotation of the pin relative to the box in one direction, said box having a surface inclined to the longitudinal axis of the box and said pin having a mating surface to engage the surface on the box to limit the movement of the pin into the box, said threads having a tooth width less than one-half of the pitch of the threads to provide axial load flank clearance between the threads and a varying axial load flank clearance between the threads when the box and pin are made-up hand-tight to cause a group of threads farthest from the engaging surfaces to engage first and initially provide the stress to compress the entire threaded portion of the box and elongate the entire threaded portion of the pin to produce the desired compressed force between the engaging surfaces.

17. The well pipe joint of claim 16 in which the varying load flank clearance between the threads is obtained by varying the pitch of the mating threads.

18. The well pipe joint of claim 16 or 17 in which the threads are straight and are divided into a large step and a small step having a major diameter and a minor diameter smaller than the major and minor diameters of the large step.

19. The well pipe joint of claim 16 in which the threads are straight and are divided into a large step and a small step having a major diameter and a minor diameter smaller than the major and minor diameters of the large step and the pitch of the threads on the small step of one of the box or pin is varied from the pitch on the other of the box or pin to cause at least some of the threads on the small step of the box and pin to engage before the threads on the large step to more evenly distribute the stress on the threads when the joint is made-up.

20. A well pipe joint including a box having internal threads, a pin having external threads for mating with the internal threads of the box to make up the joint, a tapered sealing surface on the box, a complementary tapered sealing surface on the pin, a contact shoulder on the box and a complementary contact shoulder on the pin, said tapered sealing surfaces and said contact shoulders seating in succession and in the order named when said box and pin are made-up, the first seating occurring when the joint is made-up hand-tight and the second seating occurring when the joint is subjected to additional torque of a magnitude to strain the metal of the box and pin, the improvement comprising providing the box and pin with threads having a tooth width less than one-half of the pitch of the threads to provide axial clearance between the threads and varying the axial load flank clearance between the threads when the box and Pin are made-up hand-tight to cause one or more selected threads in the group farthest from the engaging shoulders to engage first and initially provide the stress to compress the threaded portion of the box and elongate the threaded portion of the pin to move the sealing surfaces into sealing engagement and the contact shoulders into engagement with the strain required to move the shoulders into engagement being distributed over all of the pin and box with the annular shoulder on the pin.

21. The well pipe joint of claim 20 in which the pitch of at least a portion of the threads away from the second seating contact surfaces on one of the box or the pin is advanced toward the contact surfaces relative to the pitch of the threads on the other of the box or the pin to reduce the clearance between the load flanks of the selected threads to less than the clearance between the threads adjacent the second seating contact surfaces when the joint is hand-tight.

22. The well pipe joint of claim 20 in which the selected threads of at least one of the mating threads is offset relative to the other to reduce the clearance between the load flanks of the selected threads to less than the clearance between the threads adjacent the second seating contact surfaces when the joint is hand-tight.

23. The well pipe joint of claim 20 in which the pitch of at least one of the mating threads is varied to provide progressively decreasing clearances between the load flanks of the threads in the direction away from the second seating contact surfaces to provide more uniform stress in the threads when the joint is made-up.

24. The well pipe joint of claim 20 in which the pitch of at least one of the mating threads is varied to provide varying clearances between the load flanks of the threads in the direction away from the second seating contact surfaces to provide more uniform stress in the threads when the joint is made-up.

25. The well pipe joint of claims 20, 21, 22, 23, or 24 in which the threads are straight and are divided into a large step and a small step having a major diameter and a minor diameter smaller than the major and minor diameters of the large step.

26. The well pipe joint of claim 20 in which the threads are straight and are divided into a large step and a small step having a major diameter and a minor diameter smaller than the major and minor diameters of the large step and the pitch of the threads on the small of one of the box or pin is varied from the pitch on the other of the box or pin to cause at least some of the threads on the small step of the box and pin to engage before the threads on the large step to more evenly distribute the stress on the threads when the joint is made-up.

* * * * *